US012251853B2

(12) United States Patent
Bosi et al.

(10) Patent No.: US 12,251,853 B2
(45) Date of Patent: Mar. 18, 2025

(54) METHOD AND PLANT FOR MANUFACTURING CERAMIC PRODUCTS

(71) Applicant: SACMI COOPERATIVA MECCANICI IMOLA SOCIETA' COOPERATIVA, Imola (IT)

(72) Inventors: Gildo Bosi, Imola (IT); Stefano Scardovi, Imola (IT); Claudio Ricci, Imola (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 423 days.

(21) Appl. No.: 17/251,648

(22) PCT Filed: Jun. 26, 2019

(86) PCT No.: PCT/IB2019/055407

§ 371 (c)(1),
(2) Date: Dec. 11, 2020

(87) PCT Pub. No.: WO2020/003163

PCT Pub. Date: Jan. 2, 2020

(65) Prior Publication Data

US 2021/0276221 A1 Sep. 9, 2021

(30) Foreign Application Priority Data

Jun. 26, 2018 (IT) .......................... 102018000006678

(51) Int. Cl.
*B28B 5/02* (2006.01)
*B28B 1/00* (2006.01)
(Continued)

(52) U.S. Cl.
CPC .......... *B28B 17/0081* (2013.01); *B28B 1/005* (2013.01); *B28B 5/027* (2013.01);
(Continued)

(58) Field of Classification Search
None
See application file for complete search history.

(56) References Cited

U.S. PATENT DOCUMENTS 4,592,641 A * 6/1986 Roelofs .............. G03G 15/1605 399/308
5,242,014 A * 9/1993 Takahashi .............. B22D 11/16 164/451
(Continued)

FOREIGN PATENT DOCUMENTS

EP 1787779 5/2007
GB 2390154 A * 12/2003 ............. B28B 15/00
(Continued)

OTHER PUBLICATIONS

International Search Report and Written Opinion for PCT/IB2019/055407 mailed Nov. 14, 2019.

*Primary Examiner* — Jacob T Minskey
*Assistant Examiner* — Caroline Beha
(74) *Attorney, Agent, or Firm* — Workman Nydegger

(57) ABSTRACT

A method for manufacturing ceramic articles is described comprising a step of feeding, during which at least two different ceramic powders are fed so as to obtain a strip of ceramic powders having at least a first zone and at least a second zone having a given shape; a step of compacting, during which the strip of ceramic powders is compacted so as to obtain a compacted layer of ceramic powders, which is expanded relative to the strip of ceramic powders; a step of determination, during which expansion of the layer of powders is determined; and a step of printing, during which a decoration having a modified shape based on the given expansion is applied on the surface of the compacted layer of ceramic powders.

11 Claims, 3 Drawing Sheets

(51) Int. Cl.

| | |
|---|---|
| ***B28B 11/00*** | (2006.01) |
| ***B28B 11/04*** | (2006.01) |
| ***B28B 13/02*** | (2006.01) |
| ***B28B 17/00*** | (2006.01) |

(52) U.S. Cl.
CPC .......... *B28B 11/001* (2013.01); *B28B 11/048* (2013.01); *B28B 13/022* (2013.01)

(56) References Cited

U.S. PATENT DOCUMENTS

| | | | | |
|---|---|---|---|---|
| 2008/0079185 | A1* | 4/2008 | Jamrussamee ........ | B28B 13/026 264/86 |
| 2014/0017452 | A1* | 1/2014 | Pervan ...................... | B44C 1/24 427/510 |
| 2016/0074256 | A1* | 3/2016 | Strube ..................... | B32B 5/142 428/171 |

FOREIGN PATENT DOCUMENTS

| | | | | |
|---|---|---|---|---|
| WO | WO-2005005115 | A1 * | 1/2005 | ......... B28B 13/0215 |
| WO | 2005-068146 | | 7/2005 | |
| WO | WO-2015114433 | A1 * | 8/2015 | ............... B28B 3/00 |
| WO | 2017-216725 | | 12/2017 | |

* cited by examiner

METHOD AND PLANT FOR MANUFACTURING CERAMIC PRODUCTS

CROSS-REFERENCE TO RELATED APPLICATIONS

This patent application is a 371 US Nationalization of PCT international patent application no. PCT/IB2019/055407, filed Jun. 26, 2019, which claims priority from Italian patent application no. 102018000006678, filed Jun. 26, 2018, the entire disclosures of which are incorporated herein by reference.

TECHNICAL FIELD

The present invention concerns a method and a plant for manufacturing of ceramic products, in particular ceramic products having internal striations or veining.

BACKGROUND TO THE INVENTION

In the recent years, plants for the manufacturing of ceramic products such as, for example, slabs or tiles, which are able to reproduce as faithfully as possible the patterns typical of natural stone, like marble and/or granite, have become increasingly widespread. As is known, natural stones have internal striations or veining randomly distributed within their thickness.

Typically, the ceramic products of the type described above are manufactured by means of plants that comprise:

a feeding device for feeding ceramic powders of different types in the area of a feeding station; and a conveyor assembly adapted to receive the ceramic powders from the feeding device, and being adapted to feed forward the ceramic powders in the form of a strip in a substantially continuous manner along a given path from the feeding station, towards further work stations and through a compacting station, in the area of which the strip of ceramic powders is, in use, compacted to obtain a compacted layer of ceramic powders; the conveyor assembly is also adapted to feed forward the compacted layer of ceramic powder in a substantially continuous manner towards the further work stations.

The cited plants furthermore comprise a compacting device adapted to compact the strip of ceramic powders during conveying thereof along the given path in the area of the compacting station.

In further detail, the feeding device is arranged upstream of the compacting device along the given path and comprises two or more ceramic powder dosing assemblies, the ceramic powders having characteristics and/or colours different from one another to obtain a strip of ceramic powders having chromatic effects throughout their entire thickness which reproduce the patterns of natural stone and can be seen both on the surface and on the edges of the finished ceramic products. An example of a continuous machine for compacting ceramic powder is described in the international patent application under publication number WO2005/068146 by the same applicant as that of the present application.

A typical compacting device comprises a lower compactor belt positioned below in contact with the conveyor assembly and cooperating with an upper compactor belt to compact in a dry manner the strip of ceramic powder and obtain the layer of compacted powder.

The plant is also provided with a control unit connected to the printing device and comprising a memory in which an archive of reference images is stored, each of which reproduces a combination of chromatic effects (such as veining and stratifications) different from one another which are randomly reproduced on the individual slabs of compacted ceramic powder.

The plants described so far come, however, along with some drawbacks including the fact that the powders are randomly distributed and the reference image to be reproduced on the surface of the slabs is likewise selected at random. Therefore, it very frequently occurs that the chromatic effects produced in the thickness of the ceramic products that can be seen by looking at the edge of said products are not in a coordinated position relative to the surface chromatic effects obtained by means of digital printing. The lack of synchronization between the chromatic effects obtained in the thickness and the surface chromatic effects significantly compromises the aesthetics of the ceramic product, making the relative difference to a natural product much more marked.

The object of the present invention is therefore to provide a method and a plant for manufacturing ceramic products, which allow to overcome the drawbacks known in the art in an easy and economic manner.

SUMMARY

According to the present invention a method and a plant are provided according to the following independent claims and, advantageously, according to any one of the claims depending directly or indirectly on the independent claims.

BRIEF DESCRIPTION OF THE FIGURES

The invention is described below with reference to the attached drawings, which illustrate some non-limiting embodiments thereof, in which.

DETAILED DISCLOSURE

Figure 1:
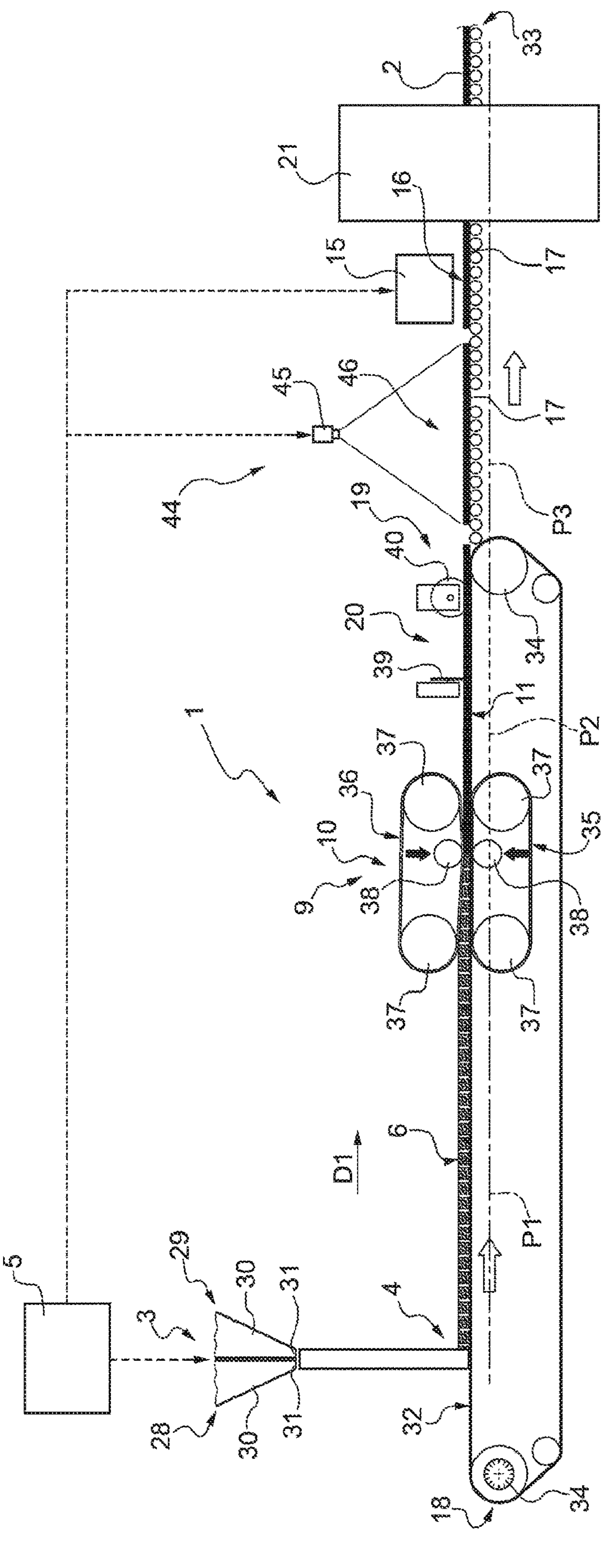
FIG. 1 is a lateral schematic view of a first embodiment of a plant for manufacturing ceramic products produced in accordance with the present invention, with parts removed for clarity.
Figure 2:
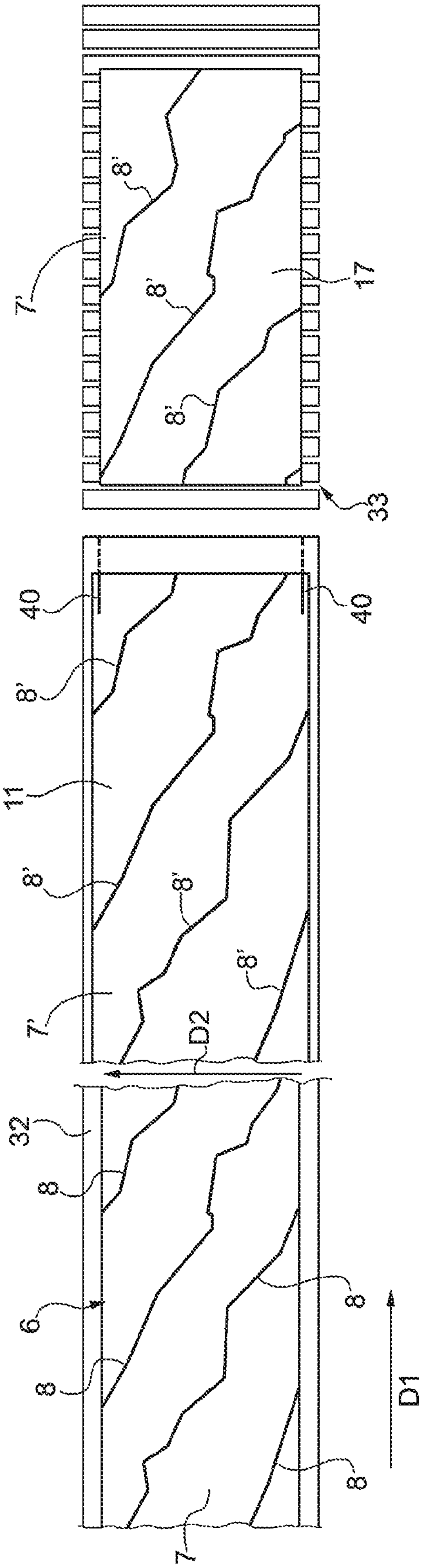
FIG. 2 is a top view of a portion of a strip of ceramic powders, of a portion of a compacted layer of ceramic powders obtained by means of compacting of the strip of ceramic powders and a separate portion obtained by means of transverse cutting of the compacted layer of ceramic powders.

Number 1 in FIG. 1 indicates as a whole a plant for manufacturing ceramic articles 2 such as, for example, tiles or ceramic slabs.

The plant 1 comprises a feeding device 3 configured to feed to an area of a feeding station 4 at least two different ceramic powders, in particular having characteristics and/or colours different from one another.

Plant 1 is also provided with a control unit 5 at least connected to feeding device 3 and configured to control the feeding of the ceramic powders so as to obtain a strip 6 of ceramic powders extending in a longitudinal direction D1 and a transverse direction D2, and having at least one first zone 7 and at least one second zone 8. In particular, the strip 6 has a defined transverse size (width).

Advantageously but not necessarily, zone 7 and zone 8 have different contents of the above-mentioned ceramic powders, in particular zone 7 has a ratio by weight between the two ceramic powders different from the ratio by weight between the two ceramic powders present in zone 8.

In particular, the difference in the content of the ceramic powders in zones 7 and 8 allows to obtain a strip 6 having features, in particular visual features, that permit the definition of striations and/or flecking and/or veining of articles 2, in particular visible at the edges of articles 2.

According to some non-limiting embodiments, the ceramic powders have different colours from one another. In this way, it is possible to create chromatic effects in the thickness of ceramic articles 2. Said chromatic effects are, for example, visible at the edges of ceramic articles 2.

Alternatively or additionally, the ceramic powders are adapted to give ceramic articles 2 different physical characteristics.

Advantageously but not necessarily, zone 8 has a given shape, in particular defined based on a reference image stored in control unit 5.

In some non-limiting cases, strip 6 comprises zone 7 (which defines a mass of said strip 6) and a plurality of zones 8 (distributed in the mass of zone 7). In particular, each zone 8 has a given shape different from the majority of the (in particular, from all the) other zones 8.

According to some non-limiting embodiments, strip 6 has various types of zones 7 and 8.

Furthermore, according to some non-limiting variations, zones 7 and 8 are formed of more than two types of ceramic powders such as to obtain desired effects (for example chromatic effects).

Preferably but not necessarily, plant 1 also comprises a compacting device 9 configured to compact, in the area of a compacting station 10, strip 6 to obtain a compacted layer 11 of ceramic powders. In particular, it should be noted that due to the compacting, compacted layer 11 is expanded in direction D1 and/or in direction D2 (in particular, in direction D1 and in direction D2) relative to strip 6. It should be noted that the expansion of compacted layer 11 relative to strip 6 also results in expansion of zone 8 (and zone 7) in direction D1 and/or in direction D2 (more precisely but not necessarily, in both directions D1 and D2). In particular, compacted layer 11 has (at least) an expanded zone 8' (obtained from expansion of the corresponding zone/s 8). In particular (in addition or alternatively), compacted layer 11 comprises (at least) an expanded zone 7' (obtained from expansion of the corresponding zone/s 7).

According to some non-limiting embodiments not illustrated, unit 5 comprises one or more auxiliary sensors, for example auxiliary photo sensors, adapted to detect (and/or determine and/or measure) the transverse size of strip 6, in particular in the area of a respective detection station interposed between feeding station 4 and compacting station 10.

Advantageously but not necessarily, plant 1 also comprises a printing device 15 (in particular, digital), which is connected to and controlled by unit 5 and is configured to apply a decoration (in particular by means of an ink) on the surface of compacted layer 11, in particular on the surface of separate portions 17 (slabs) of compacted layer 11. More in particular, the separate portions 17 are obtained from compacted layer 11 by means of (transverse) cuts of compacted layer 11.

More precisely but not necessarily, printing device 15 is arranged in the area of a printing station 16.

Advantageously but not necessarily, plant 1 also comprises a conveying assembly 18 for advancing, in particular in a continuous manner, strip 6 along a first given path P1, in particular from feeding station 4 to compacting station 10, and to advance compacted layer 11 along a second given path P2, in particular from compacting station 10 towards printing station 16 (to further work stations). Preferably but not necessarily, assembly 18 is also configured to advance separate portions 17 along a third given path P3.

In particular, path P1 and path P2 (preferably but not necessarily also path P3) extend in direction D1 (and are parallel to each other). In other words, assembly 18 is configured to advance strip 6 and compacted layer 11 along the longitudinal extension of strip 6 and compacted layer 11.

In particular, compacting device 9 is arranged downstream of feeding device 3 along path P1.

Advantageously but not necessarily, plant 1 also comprises a cutting device 19 positioned in the area of a cutting station 20, in particular arranged downstream of device 9 (in direction D1; more precisely but not necessarily, along path P2).

Preferably but not necessarily, device 19 is configured to cut (transversally) compacted layer 11 to obtain separate portions 17. More preferably but not necessarily, device 19 is also configured to (simultaneously and) longitudinally cut compacted layer 11 and/or separate portions 17.

Preferably but not necessarily, printing device 15 is arranged downstream of cutting device 19 (in direction D1; more precisely but not necessarily, along path P3).

Preferably but not necessarily, plant 1 also comprises at least one furnace 21 arranged downstream of printing device 15 (in direction D1; more precisely but not necessarily, along path P3) to sinter the compacted ceramic powders of separate portions 17 so as to obtain ceramic articles 2.

According to a non-limiting embodiment, plant 1 also comprises a drying device (not illustrated), which is arranged upstream of furnace 21 and, preferably but not necessarily, also upstream of printing device 15 (in direction D1; more precisely but not necessarily, along path P3), and is configured to dry separate portions 17 prior to sintering of the ceramic powders in furnace 21.

Additionally or alternatively, plant 1 comprises a further cutting device (known per se and not illustrated), positioned downstream of furnace 21 along path P3 to produce a further finish of ceramic articles 2.

It should be noted that, alternatively or additionally, it is possible to make further cuts on ceramic articles 2 in situ at the time of final assembly thereof (for example to make a hole for fitting a wash basin inside).

Advantageously but not necessarily, plant 1 is also provided with a scraping device, in particular a suction scarping device, (known per se and not illustrated) interposed between feeding device 3 and compacting device 9 and configured to improve the uniformity of the thickness of strip 6 and to remove excess powders.

More precisely but not necessarily, feeding device 3 comprises at least a first feeding unit 28 and at least a second feeding unit 29, in particular arranged above conveying assembly 18. Each feeding unit 28 and 29 is adapted to contain ceramic powders of a first type and a second type (different from each other) respectively.

Each feeding unit 28 and 29 comprises a respective containment chamber 30 to contain the respective ceramic powders and a relative outlet 31.

In greater detail, assembly 18 comprises a first conveyor, in particular provided with a conveyor belt 32, to advance strip 6, in particular at a first advancement speed, along at least a portion of (in particular, along) path P1. Advantageously but not necessarily, the first conveyor is also adapted to advance compacted layer 11, in particular at a second advancement speed, along at least a portion of (in particular along) path P2. Preferably but not necessarily, the first conveyor is also adapted to advance separate portions 17 along (at least) a portion of path P3.

In particular, conveyor belt 32 is configured to receive the ceramic powders in the area of station 4, to advance strip 6 to station 10 and to advance compacted layer 11 from station 10 to cutting station 20.

In further detail, conveying unit 18 (more precisely the first conveyor) comprises pulleys 34, of which at least one pulley is operated by means of an actuator, in particular an electric motor.

Advantageously but not necessarily, assembly 18 comprises a detection device, in particular an encoder (known per se and not further described) coupled with at least one of pulleys 34, for detecting and/or determining the advancement speed of strip 6.

It should be noted that, due to the compaction of strip 6, the second advancement speed is different from the (in particular, higher than the) first advancement speed. In particular, the difference between the first advancement speed and the second advancement speed varies during operation of plant 1 also if the first advancement speed is maintained constant.

According to some non-limiting embodiments (like the one illustrated), assembly 18 also comprises a second conveyor, in particular a roller conveyor 33, configured to receive separate portions 17 and to advance said separate portions 17 along (at least) a portion of path P3, in particular through printing station 16 and, more in particular, towards and into furnace 21.

According to some non-limiting embodiments, compacting device 9 comprises a lower compacting belt 35 positioned below in contact with conveyor belt 32 and configured to cooperate with an upper compacting belt 36 to compact in a dry manner strip 6 and obtain compacted layer 11.

Preferably but not necessarily, upper compacting belt 36 is inclined relative to conveyor belt 32 towards which it converges in the advancement direction (in the direction D1) to gradually increase the pressure on strip 6.

In the non-limiting example illustrated, lower compacting belt 35 and upper compacting belt 36 are wound around respective rollers 37, two of which (one for lower compacting belt 35 and one for upper compacting belt 36), in particular those arranged downstream relative to direction D1 (along path P2), are operated by a respective electric motor.

More precisely but not necessarily, both lower compacting belt 35 and upper compacting belt 36 are provided with respective compacting rollers 38 (or groups of rollers), in particular arranged in a central zone of the respective compacting belts 35 and 36.

According to a preferred but non-limiting embodiment, cutting device 19 is configured to cut compacted layer 11 at least transversally. In particular, the transverse cuts allow definition of the longitudinal size (extension) (length) of separate portions 17.

Preferably but not necessarily, cutting device 19 is also configured to longitudinally cut separate portions 17 and/or compacted layer 11 to define the transverse size (extension) (width) of separate portions 17.

In greater detail, cutting device 19 comprises at least a cutting blade 39, which is adapted to come into contact with compacted layer 11 to cut it transversally, in particular to obtain separate portions 17.

Advantageously but not necessarily, cutting device 19 also comprises at least two further rotating knives 40, which are arranged on opposite sides of conveyor belt 32 and are designed to trim the lateral edges of separate portions 17 (or of compacted layer 11).

According to some non-limiting embodiments not illustrated, rotating knives 40 are also configured to divide separate portions 17 into two or more longitudinal portions.

Advantageously but not necessarily, control unit 5 comprises a determination assembly 44 configured to detect at least a detected feature of compacted layer 11 and/or of second expanded zone 8'. Control unit 5 is configured to transform the given shape based on the detected feature so as to obtain a derived shape, and to control printing device 15 so that printing device 15 applies, in use, the decoration based on the derived shape.

In particular, control unit 5 is configured to determine (calculate and/or detect) at least a difference (based on the detected feature) between compacted layer 11 and strip 6 and/or between the given shape of second zone 8 and the real shape of second expanded zone 8'. Control unit 5 is configured to transform the given shape based on the difference between compacted layer 11 and strip 6 and/or between the given shape of second zone 8 and the real shape of second expanded zone 8' so as to obtain the derived shape.

Advantageously but not necessarily, control unit 5 is configured (in particular determination assembly 44 is configured) to determine (detect and/or calculate) a first expansion value of compacted layer 11 in direction D1 and/or a second expansion value in direction D2. In other words, the first and the second expansion value are differences between compacted layer 11 and strip 6 and/or between the given shape of second zone 8 and the real shape of second expanded zone 8'. In these cases, for example the width of compacted layer 11 and/or a real image of at least a portion of compacted layer 11 are the (at least part of the) cited detected features of compacted layer 11.

In particular, it should be noted that by means of the compaction of strip 6 in the area of station 10, compacted layer 11 expands relative to strip 6 both in direction D1 and in direction D2. In the same way, zones 7 and 8 are expanded to form zones 8' and 7'. The first and the second expansion value are an estimate of how far compacted layer 11 is extended in direction D1 and, respectively, in direction D2 relative to strip 6.

Advantageously but not necessarily, control unit 5 is configured to transform at least the given shape of zone 8 based on the first expansion value and/or the second expansion value, in particular based on the first expansion value and the second expansion value, to obtain the derived shape.

Furthermore, advantageously but not necessarily, control unit 5 is also configured to control printing device 15 so that printing device 15 applies the decoration based on the derived shape. In this way, the decoration applied on the surface by means of printing device 15 is arranged in the area of zones 8', which extend into the thickness of compacted layer 11. In other words, in this way, the decoration (in particular the ink) is applied substantially over the surface portion of zone 8'.

According to some non-limiting embodiments, control unit 5 is configured to control feeding device 3 so that the ceramic powders are fed based on the reference image defining the given shape and the position of at least second zone 8, preferably also zone 7.

Preferably but not necessarily, control unit 5 contains, in its own internal memory, at least one reference image, even more preferably a plurality of reference images.

Advantageously but not necessarily, the reference image has a surface extension, in particular in direction D1, which is greater than the surface extension (in particular, in direction D1) of a separate portion 17. In other words, the reference image or the expanded reference image (following compaction) is replicated on more than one separate portion 17. In particular, considering the fact that compaction of strip 6 results in an expansion in direction D1 and/or in direction D2 (in particular, in direction D1 and in direction D2) also the reference image as applied on strip 6 is expanded.

Therefore, advantageously but not necessarily, control unit 5 is configured to transform the reference image based on the first expansion value and/or the second expansion value (in particular, based on the first expansion value and the second expansion value) to obtain the derived shape (and a derived position of second expanded zone 8').

Advantageously but not necessarily, control unit 5 is also configured to attribute a plurality of base surface coordinates at least to part of (at least to) zone 8 (and, in particular, to store said base surface coordinates in the internal memory). In this way, control unit 5 contains the data that describe the given shape (and a given position) of zone 8 as obtained by means of operation of feeding device 3.

In particular, each set (more precisely, each pair) of surface coordinates (defining the position of a point) is determined considering a relative system of coordinates (Cartesian system), defined by a first axis parallel to direction D1 and by a second axis perpendicular to the first axis and parallel to direction D2. Therefore, each set (more precisely, each pair) of surface coordinates comprises a first value and a second value associated with the first axis and the second axis respectively.

According to some alternative non-limiting embodiments, each set (more precisely, each pair) of surface coordinates is determined considering a polar system (instead of Cartesian system) or another system suited to describing the position of a point on a plane.

According to some non-limiting embodiments, control unit 5 is configured to determine and/or detect the base surface coordinates by means of the reference image.

Alternatively or additionally, control unit 5 is configured to obtain the base surface coordinates by means of a detection device, in particular of optical type (not illustrated and not further described).

Advantageously but not necessarily, control unit 5 is also configured to transform the base surface coordinates based on the first expansion value and/or the second expansion value to obtain transformed coordinates that define the derived shape and, preferably, also the derived position.

In particular, control unit 5 is configured to control printing device 15 based on the transformed coordinates.

Advantageously but not necessarily, control unit 5 is also configured to control printing device 15 in a coordinated manner with advancement of strip 6 and compacted layer 11 (and, in particular, also separate portions 17). More precisely but not necessarily, control unit 5 is configured such as to consider the time difference between feeding of the ceramic powders in the area of station 4 and application of the decoration by printing device 15 in the area of station 16.

With particular reference to FIG. 1, according to specific non-limiting embodiments, determination assembly 44 comprises at least an acquisition device, in particular a camera 45, for acquiring a real image of at least a portion of compacted layer 11, in particular of separate portions 17, in the area of an acquisition station 46.

Advantageously but not necessarily, camera 45 is arranged downstream of compacting device 9 and upstream of printing device 15 relative to direction D1 (in particular, along path P2 and/or along path P3). In other words, station 46 is interposed between station 10 and station 16.

Advantageously but not necessarily, camera 45 is interposed between cutting device 19 and printing device 15. In other words, station 46 is interposed between station 20 and station 16.

Advantageously but not necessarily, control unit 5 is furthermore configured to process the real image to determine a real shape (derived from the deformation—more precisely but not necessarily, the expansion—of the given shape) of second expanded zone 8'. In particular, control unit 5 is configured to determine the first expansion value and/or the second expansion value by means of a comparison of the real shape with the given shape (note that the real shape is a result of expansion of compacted layer 11 relative to strip 6 due to the compaction).

Advantageously but not necessarily, control unit 5 is also configured to identify which portion of the reference image corresponds to the real image (real shape) (of strip 6 or—preferably but not necessarily—of compacted layer 11) acquired, in particular by determination assembly 44 (more precisely, by camera 45). In this way, a selected portion of the reference image is identified defining (containing) the cited given shape.

Advantageously but not necessarily, control unit 5 is configured to control printing device 15 based on the selected portion of the reference image (defining—containing—the cited given shape).

In other words, control unit 5 is configured to select the cited decoration to be applied (on compacted layer 11 of powder) from the reference image selecting the portion (containing—defining—the given shape) of said reference image based on the real image (of the real shape).

This is particularly advantageous when the reference image is particularly large (long) and, therefore, is used for particularly long sections of compacted layer 11. Note that it is preferable to use particularly large (long) reference images in order to reduce the number of ceramic articles 2 provided with the same decoration. In fact, the majority of users prefer a non-repetitive aesthetic effect, which gives a more natural feeling.

In practice, in use, according to specific embodiments, control unit 5, based on the information detected by determination assembly 44 (more precisely, by camera 45), selects a portion of the reference image so as to identify the selected portion of the reference image (and therefore the given shape). At this point, control unit 5 modifies the selected portion of the reference image (the given shape) based on the cited expansion values so as to obtain the derived shape.

According to some non-limiting embodiments, control unit 5 is configured to determine at least a plurality of expanded surface coordinates of zone 8' from the real image and, advantageously, to associate, in particular by means of a specific algorithm, respective base surface coordinates with the expanded surface coordinates. In particular, the specific algorithm used is based on the Open Source Computer Vision Library, (2015) https://github.com/itseez/opencv).

Advantageously but not necessarily, control unit 5 is configured to determine the expanded surface coordinates of at least two points of the real shape; control unit 5 is configured to associate a base surface coordinate of a point of the given shape with an expanded surface coordinate. In particular, control unit 5 is configured to associate each of two points of the given shape with a respective point of the at least two points of the real shape; more in particular, control unit 5 is configured to associate the coordinates of each of the two points of the real shape with the expanded surface coordinates of a respective one of the two points of the given shape.

Note that the expanded surface coordinates, considered relative to the corresponding base surface coordinates, reflect the expansion in direction D1 and in direction D2.

More precisely but not necessarily, the first and the second value of base surface coordinates are modified (relative to the coordinates system) due to expansion of compacted layer 11 relative to strip 6 so as to obtain a first and, respectively, a second value of respective expanded surface coordinates (of the real shape).

In particular, the comparison (more in particular, the difference) between the first values of the surface coordinates (expanded and base) and between the second values of the surface coordinates (expanded and base) allows determination of the first expansion value and/or the second expansion value.

Furthermore, it should be noted that, typically, the determination accuracy of the first expansion value and of the second expansion value is greater the higher the number of expanded surface coordinates and respective base surface coordinates used for determination of the first expansion value and the second expansion value.

In use, plant 1 allows the production of ceramic articles 2 from ceramic powders.

In accordance with a further aspect of the present invention, a method is provided for production of the ceramic articles 2. The method comprises at least the following steps:

- a step of feeding, during which at least two ceramic powders different from each other are fed, in particular in the area of feeding station 4 (more in particular, by device 3), so as to obtain strip 6 having at least zone 7 and at least zone 8;
- a step of compacting, during which strip 6 is compacted, in particular in the area of compacting station 10 (more in particular, by compacting device 9), to obtain compacted layer 11; and
- a step of printing, during which a decoration is applied (in particular, by means of the application of an ink) on the surface of compacted layer 11 (in particular, on the surface of separate portions 17). More precisely but not necessarily, the decoration is applied in the area of printing station 16 (even more precisely, by the printing device 15).

In particular, the step of compacting is (at least partially) subsequent to the step of feeding. Additionally or alternatively, the step of printing is (at least partially) subsequent to the step of compacting.

Advantageously but not necessarily, the method also comprises a step of conveying, during which strip 6 is conveyed through compacting station 10 and compacted layer 11 (and/or separate portions 17) is (are) conveyed from compacting station 10 to printing station 16 and through printing station 16.

In particular, the method (more precisely, the step of conveying) comprises:

- a first step of advancement, during which strip 6 is advanced (in particular, at the first advancement speed) along path P1 (in particular, from feeding station 4 to compacting station 10);
- a second step of advancement (at least partially subsequent to the first step of advancement), during which compacted layer 11 is advanced along path P2 (in particular from station 10 to cutting station 20); and
- advantageously but not necessarily, at least a third advancement step (at least partially subsequent to the second step of advancement), during which separate portions 17 are advanced along path P3, in particular from station 20 at least to printing station 16.

Preferably but not necessarily, the method also comprises a step of cutting, during which (in particular, in the area of cutting station 20) compacted layer 11 is cut to obtain separate portions 17.

Advantageously but not necessarily, the method also comprises a step of firing, during which the ceramic powders of separate portions 17 are sintered (in particular, by means of furnace 21), in particular to obtain articles 2. Preferably but not necessarily, the step of firing is performed after the step of printing.

According to some non-limiting embodiments, the method also comprises a step of drying (in particular, carried out prior to the step of firing; more in particular, carried out also prior to the step of printing), during which separate portions 17 are dried. Preferably but not necessarily, the step of drying is carried out by means of the drying device.

In greater detail, according to some non-limiting embodiments, during the step of feeding the ceramic powders are fed based on the reference image defining the shape (and the position) at least of zone 8, preferably also of zone 7.

Preferably but not necessarily, control unit 5 controls feeding device 3, in particular based on the reference image (more in particular, so as to reproduce the reference image). More precisely but not necessarily, control unit 5 controls at least first feeding unit 28 and second feeding unit 29 to feed (in the area of feeding station 4) the ceramic powders on belt 32.

In further detail, during the step of compacting, strip 6 is gradually compacted, in particular by means of device 9, even more in particular by means of cooperation between compactor belt 35 and compactor belt 36.

Preferably but not necessarily, the step of compacting is performed during the step of conveying (in particular, during the first step of advancement and during the second step of advancement).

In further detail, during the first step of advancement, the strip 6 is advanced by means of the belt 32.

Preferably but not necessarily, during the first step of advancement, the first advancement speed is detected by means of the detection element of assembly 18.

More precisely but not necessarily, during the second step of advancement, compacted layer 11 is advanced by means of belt 32 and interaction with compactor belts 35 and 36.

In particular, the second advancement speed is greater than the first advancement speed.

More precisely but not necessarily, during the third advancement step, separate portions 17 advance from cutting station 20 through printing station 16 to furnace 21 (in particular, prior to station 16 also through the drying device).

Preferably but not necessarily, during the third advancement step (and prior to the step of printing) separate portions 17 are transferred from belt 32 to roller conveyor 33.

In further detail, during the step of cutting, layer 17 is cut at least transversally, in particular by blade 39. In particular, the transverse cut (of compacted layer 11) defines the longitudinal size (length) of the separate portions 17.

Preferably but not necessarily, during the step of cutting, separate portions 17 and/or compacted layer 11 are/is cut longitudinally, in particular to define the transverse size (width) of separate portions 17.

Advantageously, the method also comprises:

a step of determination, in particular (at least partially) subsequent to the step of compacting (and prior to the step of printing), during which at least a detected feature of compacted layer 11 and/or of second expanded zone 8' is detected;

a step of transformation, in particular (at least partially) subsequent to the step of determination, during which the given shape (and, in particular, the given position of second zone 8) is modified (are modified) based on the detected feature so as to obtain a derived shape.

According to some non-limiting embodiments (during the step of determination), at least a difference between compacted layer 11 and strip 6 and/or between the given shape of second zone 8 and the real shape of second expanded zone 8' is determined (namely, calculated and/or detected) based on the detected feature. The given shape is transformed (modified) based on the difference between compacted layer 11 and strip 6 and/or between the given shape of second zone 8 and the real shape of second expanded zone 8' so as to obtain the derived shape.

In particular (during the step of determination), the first expansion value and/or the second expansion value is determined (namely, detected and/or calculated). During the step of transformation, the given shape is transformed based on the first expansion value and/or the second expansion value to obtain the derived shape. In particular, during the step of transformation, the given position (of second zone 8) is transformed based on the first expansion value and/or the second expansion value to obtain the derived position.

In particular, the step of transformation is prior to the step of printing.

During the step of printing, the decoration is applied based on the derived shape (in particular, so as to reproduce the derived shape). In particular, during the step of printing, the decoration is applied based on the derived position.

More precisely but not necessarily, control unit 5 controls device 15 based on the derived shape. In this way it is possible to obtain a greater correspondence between the position of the decoration on the surface of compacted layer 11 (in particular, on separate portions 17) and the real shape (and position) of expanded zone 8'.

According to some non-limiting embodiments, the method also comprises a step of assigning, during which the base surface coordinates are assigned at least to one part (one or more points) of zone 8. In particular, the step of assigning is carried out during the step of feeding.

According to some non-limiting embodiments, the base surface coordinates are determined based on the reference image and/or by means of a detection device (which detects the position of at least one part—or several points—of zone 8 of strip 6 of ceramic powders).

Advantageously but not necessarily, during the step of transformation, the base surface coordinates are transformed based on the first expansion value and/or the second expansion value (in particular, based on the first expansion value and the second expansion value) to obtain transformed coordinates that define the derived shape.

Preferably but not necessarily, the method (in particular, the step of determination) also comprises an step of acquisition, which is at least partially subsequent to the step of compacting, and during which a real image is acquired (in particular by camera 45) of at least a part of compacted layer 11, in particular of a respective separate portion 17; and a step of processing (in particular subsequent to the step of acquisition), during which the real image is processed to determine a real shape (obtained by the deformation—in particular, by the expansion—of the given shape—of second expanded zone 8'). In particular, the real image is processed in accordance with the description in the book by William K. Pratt, 2001 (Digital Image Processing: PIKS Inside, Third Edition. William K. Pratt. (2001) John Wiley & Sons, Inc. ISBNs: 0-471-37407-5 (Hardback); 0-471-22132-5 (Electronic)).

Advantageously but not necessarily, during the step of processing, it is identified (in particular, by means of control unit 5) which portion of the reference image corresponds to the real image (real shape) (of strip 6 or—preferably but not necessarily—of compacted layer 11) acquired, in particular by determination assembly 44 (more precisely, by camera 45). In this way, a selected portion of the reference image defining (containing) the cited given shape is identified.

In particular, during the step of printing, the decoration of the selected portion of the reference image is printed based on the selected portion of the reference image.

In other words, the cited decoration to be applied (on compacted layer 11 of powder) is taken from the reference image by selecting the portion (containing—defining—the given shape) of the reference image based on the real image (of the real shape acquired).

In practice, in use, according to specific embodiments, a portion of the reference image is selected so as to identify the selected portion of the reference image (and therefore the given shape). At this point, the selected portion of the reference image (the given shape) is modified based on the cited expansion values so as to obtain the derived shape.

According to some non-limiting embodiments, during the step of determination, the real shape is compared with the given shape to determine the first expansion value and/or the second expansion value.

Preferably but not necessarily, during the step of processing the expanded surface coordinates of at least two points of the real shape are determined.

According to some non-limiting embodiments, a base surface coordinate of a point of the given shape is associated with an expanded surface coordinate. In particular, each of the at least two points of the real shape are associated with a respective one of the two points of the given shape. More in particular, the coordinates of each of the two points of the real shape are associated with the expanded surface coordinates of a respective one of the two points of the given shape.

It should be noted that the expanded surface coordinates, considered relative to the corresponding base surface coordinates, reflect the expansion in the direction D1 and in the direction D2.

More precisely but not necessarily, during the step of determination, the first and the second value of the base surface coordinates are modified (relative to the system of coordinates) based on the expansion of the compacted layer 11 relative to strip 6 so as to obtain a first and, respectively, a second value of respective expanded surface coordinates (of the real shape).

In particular, the comparison (more in particular, the difference between) the first values of the surface coordinates (expanded and base) and between the second values of the surface coordinates (expanded and base) allows determination of the first expansion value and/or the second expansion value.

In particular, during the step of determination, the first expansion value and/or the second expansion value are determined based on the expanded surface coordinates and the respective base surface coordinates. More precisely but not necessarily, during the step of determination, the first expansion value and/or the second expansion value are determined based on the differences between the expanded surface coordinates and the respective base surface coordinates.

In accordance with preferred but non-limiting embodiments, during the step of transformation, the reference image is transformed based on the first expansion value and/or the second expansion value to obtain the derived shape (and the derived position).

More precisely but not necessarily, during the step of printing, the decoration is applied on the surface of separate portion 17. In particular, during the step of printing the real transverse size and the real longitudinal size of separate portion 17 are considered so as to apply the decoration only on the surface of separate portion 17. Preferably but not necessarily, those parts of the decoration defined by the derived shape which extend beyond the separate portion 17 are omitted. This provides a saving on ink.

Figure 3:
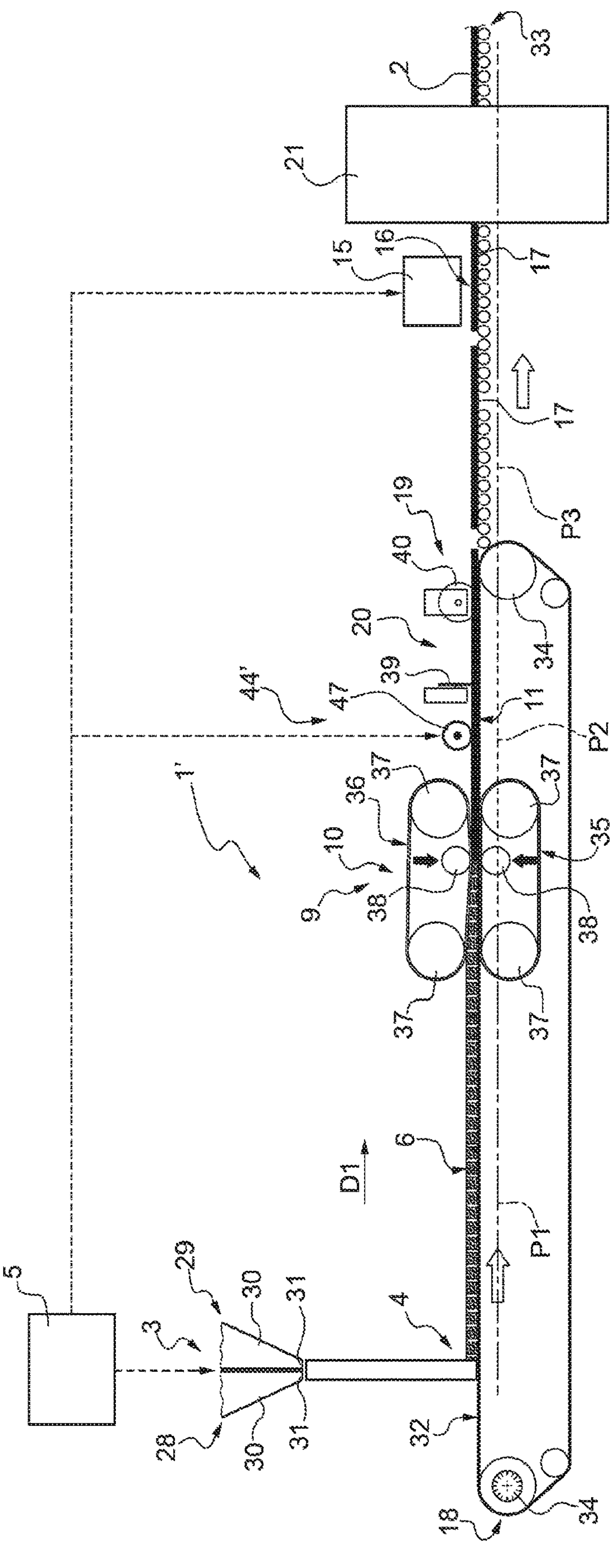
FIG. 3 is a lateral schematic view of a further embodiment of a plant in accordance with the present invention, with parts removed for clarity.

Number 1' in FIG. 3 indicates an alternative and advantageous embodiment of a plant in accordance with the present invention. Plant 1' is similar to plant 1 and is therefore described below only in terms of the differences relative to plant 1, indicating by the same reference numbers parts equal or equivalent to parts already described for plant 1.

In particular, plant 1' differs from plant 1 due to the fact that unit 5 comprises a determination assembly 44' different from determination assembly 44.

In further detail, assembly 44' comprises a speed detection element (in particular a detection wheel 47) adapted to detect (and/or determine) the second advancement speed.

Preferably but not necessarily, wheel 47 is configured to be in contact, in use, with compacted layer 11 and to be caused to rotate by compacted layer 11, which advances, in use, at the second advancement speed along path P2. In particular, the second advancement speed is determined based on the rotation speed of wheel 47.

Preferably but not necessarily, unit 5 is configured (in particular, assembly 44' is configured) to determine the first expansion value based on the first advancement speed and the second advancement speed (in particular, based on the difference between the second advancement speed and the first advancement speed).

Advantageously but not necessarily, assembly 44' comprises (furthermore) one or more sensors (not illustrated), for example photo sensors, adapted to detect (and/or measure) (in the area of a respective detection station) a transverse size (in direction D2—width) of compacted layer 11. In particular, the detection station is interposed between compacting station 10 and cutting station 20.

Preferably but not necessarily, unit 5 is configured to determine the second expansion value based on the transverse size of strip 6 and of compacted layer 11. In particular, unit 5 is configured to determine the second expansion value based on the difference between the transverse size of strip 6 and compacted layer 11.

The method for the production of ceramic articles 2 by means of plant 1' is analogous to the method for the production of ceramic articles 2 implemented by plant 1 and differs from it only in the following aspects.

In particular, the method (more in particular, the step of determination) also comprises a step of detection, during which the second advancement speed of compacted layer 11 is determined. During the step of determination, the first expansion value is determined based on the first advancement speed and the second advancement speed (in particular, based on the difference between the second advancement speed and the first advancement speed).

In further detail, during the step of detection, wheel 47 is in contact with the surface of the compacted layer 11 and is caused to rotate by compacted layer 11. By detecting the rotation speed of wheel 47, the second advancement speed is determined (detected and/or calculated).

Preferably but not necessarily, during the step of detection, at least the transverse size (width) of compacted layer 11 (in particular, also the transverse size of strip 6) is detected (and/or determined and/or measured). During the step of determination, the second expansion value is determined based on the transverse size of strip 6 and of compacted layer 11 (in particular, based on the difference between the transverse size of strip 6 and compacted layer 11).

More precisely but not necessarily, during the step of detection, the transverse size of compacted layer 11 is determined by means of the respective sensor or the respective sensors.

Advantageously but not necessarily, the method comprises a further step of detection, during which the first advancement speed is detected. In particular, the first advancement speed is detected by means of the detection element of assembly 18, in particular the encoder.

Alternatively or additionally, a further step of detection is also carried out during which the transverse size of strip 6 is detected (and/or determined and/or measured), in particular by means of the auxiliary sensor/s.

Advantageously but not necessarily, the method for manufacturing ceramic articles 2 described above is implemented by plant 1.

Plant 1 and the method for manufacturing ceramic articles 2 described above (in accordance with the present invention) have various advantages with respect to the state of the art.

In particular, in accordance with the present invention, it is possible to obtain an improved synchronization between the surface decoration applied by means of printing device 15 and the characteristics, in particular the chromatic characteristics, obtained in the thickness of separate portions 17. This allows ceramic articles 2 to be obtained very similar to the natural product.

It is clear that modifications and variations that do not depart from the protective scope defined by the claims can be made to plant 1 and to the method described and illustrated here.

According to some non-limiting embodiments, unit 5 comprises both determination assembly 44 and determination assembly 44' (or a combination of their parts) and unit 5 could be configured to determine the first expansion value and/or the second expansion value by means of the use of (or part of) assembly 44 and/or of (or part of) assembly 44'.

The invention claimed is:

1. A method for manufacturing ceramic articles comprising:

a step of feeding, during which at least two different ceramic powders are fed so as to obtain a strip of ceramic powders extending along a longitudinal direction and a transverse direction and having at least a first zone and at least a second zone, which have different contents of said ceramic powders; the second zone having a given shape;

a step of compacting, during which the strip of ceramic powders is compacted so as to obtain a compacted layer of ceramic powders, which is expanded in the longitudinal direction and/or in the transverse direction relative to the strip of ceramic powders;

a step of determination, during which a first value of expansion of the compacted layer of ceramic powders in the longitudinal direction and/or a second value of expansion in the transverse direction are determined;

a step of transformation, executed by a control unit, during which the given shape is transformed based on the first expansion value and/or the second expansion value so as to obtain a derived shape; and a step of printing, during which a decoration is applied by a printing device and by the application of an ink on the surface of the compacted layer of ceramic powders, wherein the step of printing is performed subsequent to the step of compacting, wherein during the step of printing, the printing device is controlled by the control unit so that the decoration is applied based on the derived shape, wherein the compacted layer expands relative to the strip both in the longitudinal direction and in the transverse direction, and wherein the compacted layer comprises at least one first expanded zone and at least one second expanded zone.

2. The method according to claim 1, further comprising:

a step of assigning, during which a plurality of base surface coordinates are assigned at least to the second zone of the strip of ceramic powders, and wherein during the step of transformation, the base surface coordinates are transformed based on the first expansion value and/or on the second expansion value so as to obtain transformed coordinates, which define the derived shape.

3. The method according to claim 2, further comprising:

a step of acquisition, which is at least partially subsequent to the step of compacting and during which a real image of at least a portion of the compacted layer of ceramic powders is acquired; and a step of processing, during which the real image is processed in order to determine a real shape of the second zone obtained following the step of compacting, wherein during the step of determination, the real shape is compared with the given shape in order to determine the first expansion value and/or the second expansion value, wherein during the step of processing, expanded surface coordinates of at least two points of the real shape are determined, and wherein each expanded surface coordinate is associated with a respective base surface coordinate of a point of the given shape; during the step of determination, the first expansion value and/or the second expansion value is/are determined based on the expanded surface coordinates and on the respective base surface coordinates.

4. The method according to claim 1, further comprising:

a step of acquisition, which is at least partially subsequent to the step of compacting and during which a real image of at least a portion of the compacted layer of ceramic powders is acquired;

a step of processing, during which the real image is processed in order to determine a real shape of the second zone obtained following the step of compacting, and wherein during the step of determination, the real shape is compared with the given shape in order to determine the first expansion value and/or the second expansion value.

5. The method according to claim 1, further comprising:

a first step of advancement, during which the strip of ceramic powders is advanced at a first advancing speed along a first path;

a second step of advancement, during which the compacted layer of ceramic powders is advanced along a second path; and a step of detection, during which a second advancement speed of the compacted layer of ceramic powders is determined, wherein, during the step of determination, the first expansion value is determined based on the first advancement speed and on the second advancement speed, in particular on the difference between the second advancement speed and the first advancement speed.

6. The method according to claim 5, wherein, during the step of detection, a detection wheel is in contact with the surface of the compacted layer of ceramic powders and is caused to rotate by the compacted layer of ceramic powders advancing along the second path, and wherein the second advancement speed is determined based on the rotation speed of the detection wheel.

7. The method according to claim 1, wherein the strip of ceramic powders has a first transverse size, and wherein during the step of determination, a second transverse size of the compacted layer of ceramic powders is measured and the second expansion value is determined based on the first transverse size and on the second transverse size, based on the difference between the second transverse size and the first transverse size.

8. The method according to claim 1, wherein, during the step of feeding, the ceramic powders are fed based on a reference image defining the given shape and the position of at least the second zone, and wherein during the step of transformation, the reference image is transformed based on the first expansion value and/or on the second expansion value in order to obtain the derived shape and the derived position.

9. The method according to claim 1, further comprising:

a step of cutting, during which the compacted layer of ceramic powders is cut so as to obtain at least a separate portion of the compacted layer of ceramic powders, wherein during the step of printing, the decoration is applied on the surface of the separate portion.

10. The method according to claim 8, further comprising:

a step of cutting, during which the compacted layer of ceramic powders is cut so as to obtain at least a separate portion of the compacted layer of ceramic powders, wherein during the step of printing, the decoration is applied on the surface of the separate portion, and wherein the reference image has a greater surface extension than the surface extension of the separate portion.

11. The method according to claim 9, wherein, during the step of printing, a real transverse size and a real longitudinal size of the separate portion are considered so as to apply the decoration only on the surface of the separate portion.

* * * * *